(12) United States Patent  
Cao et al.

(10) Patent No.: US 12,309,208 B2
(45) Date of Patent: May 20, 2025

(54) PACKET TRANSMISSION PATH DETERMINING METHOD, APPARATUS, AND SYSTEM, AND COMPUTER STORAGE MEDIUM

(71) Applicant: Huawei Technologies Co., Ltd., Shenzhen (CN)

(72) Inventors: Yanping Cao, Nanjing (CN); Zhenwei Zhang, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 277 days.

(21) Appl. No.: 17/587,539

(22) Filed: Jan. 28, 2022

(65) Prior Publication Data

US 2022/0158936 A1 May 19, 2022

Related U.S. Application Data

(63) Continuation of application No. PCT/CN2020/106492, filed on Aug. 3, 2020.

(30) Foreign Application Priority Data

Aug. 1, 2019 (CN) .......................... 201910708597.8

(51) Int. Cl.
*H04L 65/1069* (2022.01)
*H04L 45/00* (2022.01)
*H04L 45/28* (2022.01)
*H04L 45/42* (2022.01)

(52) U.S. Cl.
CPC .......... *H04L 65/1069* (2013.01); *H04L 45/22* (2013.01); *H04L 45/28* (2013.01); *H04L 45/38* (2013.01); *H04L 45/42* (2013.01)

(58) Field of Classification Search
CPC ......... H04L 45/42; H04L 45/22; H04L 45/28; H04L 45/38; H04L 45/26; H04L 43/106; H04L 43/10; H04L 45/24; H04L 67/1095
See application file for complete search history.

(56) References Cited

U.S. PATENT DOCUMENTS

| 6,389,448 B1 * | 5/2002 | Primak | H04L 67/1029 |
| | | | 709/225 |
| 6,865,689 B1 * | 3/2005 | Gibson | H04L 43/50 |
| | | | 714/4.2 |
| 9,088,506 B2 * | 7/2015 | Keesara | H04L 49/20 |
| 9,621,453 B1 * | 4/2017 | Pani | H04L 47/22 |

(Continued)

FOREIGN PATENT DOCUMENTS

| CN | 103746828 A | 4/2014 |
| CN | 104322023 A | 1/2015 |
| CN | 106375105 A | 2/2017 |

(Continued)

*Primary Examiner* — Chris Parry
*Assistant Examiner* — Dixon F Dabipi
(74) *Attorney, Agent, or Firm* — Conley Rose, P.C.

(57) ABSTRACT

A packet transmission path determining method includes a management device that obtains N mirrored packets of a target packet, where each mirrored packet is generated by one of N network devices that transmit the target packet, and each mirrored packet comprises an identifier of the network device that generates the mirrored packet. The management device determines a transmission path of the target packet based on the N mirrored packets.

20 Claims, 10 Drawing Sheets

(56) References Cited

U.S. PATENT DOCUMENTS

2016/0352601 A1* 12/2016 Zhang ................ H04L 43/0829
2018/0159759 A1   6/2018 Liang et al.

FOREIGN PATENT DOCUMENTS

| | | |
|---|---|---|
| CN | 106464590 A | 2/2017 |
| CN | 106878106 A | 6/2017 |
| CN | 107809433 A | 3/2018 |
| CN | 108075936 A | 5/2018 |
| CN | 109245957 A | 1/2019 |
| CN | 109379241 A | 2/2019 |
| EP | 3355532 A1 * | 8/2018 ......... H04L 12/4633 |

* cited by examiner

PACKET TRANSMISSION PATH DETERMINING METHOD, APPARATUS, AND SYSTEM, AND COMPUTER STORAGE MEDIUM

CROSS-REFERENCE TO RELATED APPLICATIONS

This application is a continuation application of International Application No. PCT/CN2020/106492, filed on Aug. 3, 2020, which claims priority to Chinese Patent Application No. 201910708597.8, filed on Aug. 1, 2019. The disclosures of the aforementioned applications are hereby incorporated by reference in their entireties.

TECHNICAL FIELD

This application relates to the field of network technologies, and in particular, to a packet transmission path determining method, apparatus, and system, and a computer storage medium.

BACKGROUND

In a current network, a service fault usually occurs because traffic is interrupted due to a network environment problem, an incorrect manual operation, or a device defect. Most of services (for example, financial services, banking services, and the like) are very sensitive to service faults. Therefore, after a service fault occurs, fault locating needs to be performed in time, and a corresponding isolation or recovery measure needs to be taken on a faulty device. Currently, fault locating usually needs to be implemented based on a packet transmission path corresponding to a faulty service.

Traceroute (Tracert) is a common means currently used to determine the packet transmission path. A manner of determining a transmission path of a target packet using the traceroute technology includes transmitting, in a network, a probe packet whose source Internet Protocol (IP) address is the same as a source IP address of the target packet and whose destination IP address is the same as a destination IP address of the target packet, to determine a transmission path of the probe packet as the transmission path of the target packet.

However, because a current network has a relatively large scale, a plurality of transmission paths may be established between a source end device and a destination end device of the target packet, and the transmission path of the probe packet may be different from an actual transmission path of the target packet. Consequently, reliability of the packet transmission path determined using the traceroute technology is relatively low.

SUMMARY

This application provides a packet transmission path determining method, apparatus, and system, and a computer storage medium, to resolve a current problem that reliability of a determined packet transmission path is relatively low.

According to a first aspect, a packet transmission path determining method is provided. A management device obtains N mirrored packets of a target packet, where each mirrored packet is generated by one of N network devices that transmit the target packet, each mirrored packet comprises an identifier of the network device that generates the mirrored packet, and N is an integer greater than 1. The management device determines a transmission path of the target packet based on the N mirrored packets.

Because the mirrored packet of the target packet is essentially a duplicate packet of the target packet, the management device determines the transmission path of the target packet based on the mirrored packet of the target packet, that is, the management device determines the transmission path based on the target packet itself, and reliability of the determined packet transmission path is high. In addition, the packet transmission path determining method provided in this application can implement real-time restoration of the packet transmission path, and ensure timeliness of determining the packet transmission path.

In a possible implementation, that the management device determines a transmission path of the target packet based on the N mirrored packets includes a management device that determines, based on the time to live in the N mirrored packets and the identifier of the network device in each mirrored packet, a time sequence at which the target packets arrives at the N network devices, to obtain the transmission path. In this application, a transmission path of the target packet forwarded at layer 3 can be restored using this implementation.

In another possible implementation, that the management device determines a transmission path of the target packet based on the N mirrored packets includes a management device that determines, based on a time sequence of receiving the N mirrored packets and the identifier of the network device in each mirrored packet, a time sequence at which the target packets arrives at the N network devices, to obtain the transmission path. In this application, a transmission path of the target packet forwarded at layer 2 and/or a transmission path of the target packet forwarded at layer 3 can be restored using this implementation.

In still another possible implementation, the mirrored packet comprises a generation timestamp for generating the mirrored packet by the network device, and that the management device determines a transmission path of the target packet based on the N mirrored packets includes a management device that determines a time sequence for the target packet in arriving at the N network devices based on generation timestamps in the N mirrored packets, to obtain the transmission path. Optionally, high-precision clock synchronization, for example, 1588 clock synchronization, may be deployed on the management device and each network device in a communication network. If clocks are precisely synchronized among devices in the communication network, accuracy of the transmission path of the target packet determined by the management device based on the generation timestamp in each mirrored packet is high, and the transmission path of the target packet forwarded at layer 2 and/or the transmission path of the target packet forwarded at layer 3 can be accurately restored.

Optionally, when the target packet is a Transmission Control Protocol (TCP) control packet, the management device further determines, based on the N mirrored packets, whether a communication process, based on the target packet, between a source end device of the target packet and a destination end device of the target packet succeeds. When the communication process, based on the target packet, between the source end device and the destination end device fails, the management device determines the transmission path as an abnormal flow path.

In this application, whether the communication process, based on the target packet, between the source end device and the destination end device succeeds is determined using the target packet, to determine whether the restored transmission path is normal.

Optionally, the target packet is the TCP control packet, and the communication process based on the target packet includes establishing a TCP connection based on the target packet or disconnecting a TCP connection based on the target packet.

Because an amount of data of the TCP control packet transmitted in the communication network is relatively small, the management device only needs to restore the packet transmission path using a mirrored packet of the TCP control packet, which requires a relatively small workload. In addition, the TCP control packet has a TCP flag, and the network device can obtain the TCP control packet through matching by filtering TCP flags of packets.

Optionally, the TCP control packet may be a TCP control packet used to establish the TCP connection or a TCP control packet used to disconnect the TCP connection. Because both the TCP control packet used to establish the TCP connection and the TCP control packet used to disconnect the TCP connection include a request packet sent by the source end device to the destination end device and an acknowledgment packet sent by the destination end device to the source end device, the management device may determine whether the TCP connection is successfully established or whether the TCP connection is successfully disconnected based on whether a mirrored packet of the acknowledgment packet generated by the destination end device based on the request packet is received.

Optionally, after determining the transmission path as the abnormal flow path, the management device further determines, based on the abnormal flow path and a normal flow path, a faulty device that causes the communication process, based on the target packet, between the source end device and the destination end device to fail. The normal flow path is a historical path in which a communication process, based on a historical packet, between the source end device and the destination end device succeeds.

In an implementation, when the abnormal flow path is different from the normal flow path, that the management device determines, based on the abnormal flow path and a normal flow path, a faulty device that causes the communication process, based on the target packet, between the source end device and the destination end device to fail includes, when the first network device in the normal flow path is different from the first network device in the abnormal flow path, determining the first network device in the normal flow path as the faulty device; and when the first $i-1$ network devices in the normal flow path are the same as the first $i-1$ network devices in the abnormal flow path, and a target condition is met, determining an $(i-1)^{th}$ network device in the normal flow path as a first to-be-determined faulty device, determining an $i^{th}$ network device in the normal flow path as a second to-be-determined faulty device, and determining the faulty device in the first to-be-determined faulty device and the second to-be-determined faulty device, where $1<i\leq m$, $i-1\leq n$, and m is a quantity of network devices in the normal flow path, where the target condition is, $n=i-1$, or $n>i-1$ and the $i^{th}$ network device in the normal flow path is different from an $i^{th}$ network device in the abnormal flow path.

In this application, when different network devices exist in the abnormal flow path and the normal flow path, a network device in the normal flow path that is the last one in network devices the same as those in the abnormal flow path may be determined as a breakpoint device. Usually, the transmission path of the target packet should be the normal flow path. Because the breakpoint device exists in the normal flow path, the target packet is switched from the normal flow path to the abnormal flow path for transmission. Therefore, when the first $i-1$ network devices in the normal flow path are the same as the first $i-1$ network devices in the abnormal flow path, a quantity of network devices in the abnormal flow path is greater than $i-1$, and the $i^{th}$ network device in the normal flow path is different from the $i^{th}$ network device in the abnormal flow path, the management device may determine the $(i-1)^{th}$ network device (the breakpoint device) in the normal flow path as a to-be-determined faulty device.

Optionally, that the management device determines the faulty device in the first to-be-determined faulty device and the second to-be-determined faulty device includes a management device that obtains first device data of the first to-be-determined faulty device and second device data of the second to-be-determined faulty device when the transmission path between the source end device and the destination end device is the normal flow path. The management device obtains third device data of the first to-be-determined faulty device and fourth device data of the second to-be-determined faulty device in a transmission process of the target packet. The management device determines device data change information of the first to-be-determined faulty device based on the first device data and the third device data, and determines device data change information of the second to-be-determined faulty device based on the second device data and the fourth device data. The management device determines the faulty device based on the device data change information of the first to-be-determined faulty device and the device data change information of the second to-be-determined faulty device. The first device data, the second device data, the third device data, and the fourth device data all include at least one of management plane data, data plane data, or control plane data.

Optionally, that the management device determines the faulty device based on the device data change information of the first to-be-determined faulty device and the device data change information of the second to-be-determined faulty device includes, when device data of the first to-be-determined faulty device does not change, and device data of the second to-be-determined faulty device changes, determining the second to-be-determined faulty device as the faulty device; or when device data of the first to-be-determined faulty device changes, and device data of the second to-be-determined faulty device does not change, determine the first to-be-determined faulty device as the faulty device.

Optionally, that the management device determines the faulty device based on the device data change information of the first to-be-determined faulty device and the device data change information of the second to-be-determined faulty device further includes, when both device data of the first to-be-determined faulty device and device data of the second to-be-determined faulty device change, determining root cause information in the device data change information of the first to-be-determined faulty device and the device data change information of the second to-be-determined faulty device based on a preset determining rule, and determining a to-be-determined faulty device corresponding to the root cause information as the faulty device.

In this application, fault locating is implemented based on the packet transmission path. When performing fault locating, the management device first determines the breakpoint device in the transmission path, but the breakpoint device is not necessarily the faulty device. Therefore, both the breakpoint device in the normal flow path and a downstream device of the breakpoint device are used as to-be-determined faulty devices, and an actual faulty device is further determined in the to-be-determined faulty devices such that accuracy of fault locating can be improved. In addition, the faulty device can be determined by comparing the normal flow path with the abnormal flow path, and a fault locating process is relatively simple and fast fault locating can be implemented.

Optionally, the management device further outputs an identifier of the faulty device and a fault root cause of the faulty device, where the fault root cause of the faulty device is obtained based on device data change information of the faulty device.

In this application, the management device may further determine the fault root cause based on the device data change information of the faulty device, to implement automatic root cause locating.

In another implementation, when the abnormal flow path is the same as the normal flow path, that the management device determines, based on the abnormal flow path and a normal flow path, a faulty device that causes the communication process, based on the target packet, between the source end device and the destination end device to fail includes a management device that determines the last network device in the normal flow path and the destination end device as to-be-determined faulty devices. When determining that the last network device is not faulty, the management device determines the destination end device as the faulty device.

According to a second aspect, a packet transmission path determining method is provided. After receiving a target packet, a network device generates a mirrored packet of the target packet, where the mirrored packet comprises an identifier of the network device. The network device sends the mirrored packet to a management device such that the management device determines a transmission path of the target packet.

Optionally, the network device obtains the target packet based on an access control list in the network device.

In this application, because the network device obtains the target packet based on the access control list and performs a mirroring operation on the target packet, and a central processing unit (CPU) of the network device does not need to participate in an entire process, performance of the network device is not affected. Moreover, in a process of performing the mirroring operation on the target packet, the network device does not change the target packet such that the transmission path of the target packet is not affected.

Optionally, the target packet includes a TCP control packet.

Optionally, the network device sends updated device data to the management device after a device status of the network device changes, where the device data includes at least one of management plane data, data plane data, or control plane data.

According to a third aspect, a packet transmission path determining apparatus is provided. The apparatus is used in a management device. The apparatus includes a plurality of function modules, and the plurality of function modules interact with each other to implement the method according to the first aspect and the implementations of the first aspect. The plurality of function modules may be implemented based on software, hardware, or a combination of software and hardware, and the plurality of function modules may be randomly combined or divided based on an implementation.

According to a fourth aspect, another packet transmission path determining apparatus is provided. The apparatus is used in a network device. The apparatus includes a plurality of function modules, and the plurality of function modules interact with each other to implement the method according to the second aspect and the implementations of the second aspect. The plurality of function modules may be implemented based on software, hardware, or a combination of software and hardware, and the plurality of function modules may be randomly combined or divided based on an implementation.

According to a fifth aspect, a management device is provided. The management device includes a processor and a memory.

The memory is configured to store a computer program, where the computer program includes program instructions.

The processor is configured to invoke the computer program to implement the packet transmission path determining method according to any implementation of the first aspect.

According to a sixth aspect, a network device is provided. The network device includes a processor and a memory.

The memory is configured to store a computer program, where the computer program includes program instructions.

The processor is configured to invoke the computer program to implement the packet transmission path determining method according to any implementation of the second aspect.

According to a seventh aspect, a packet transmission path determining system is provided. The system includes a network device and a management device. The management device includes the packet transmission path determining apparatus according to any implementation of the third aspect, and the network device includes the packet transmission path determining apparatus according to any implementation of the fourth aspect.

According to an eighth aspect, a computer storage medium is provided. The computer storage medium stores instructions; and when the instructions are executed by a processor of a management device, the packet transmission path determining method according to any implementation of the first aspect is implemented; or when the instructions are executed by a processor of a network device, the packet transmission path determining method according to any implementation of the second aspect is implemented.

Beneficial effects brought by the technical solutions provided in this application include at least the following.

According to the packet transmission path determining method provided in this application, after receiving the target packet, the network device in the communication network can generate the mirrored packet of the target packet, and send the mirrored packet to the management device. The management device determines the transmission path of the target packet based on a plurality of mirrored packets of the target packet. Because the mirrored packet of the target packet is essentially a duplicate packet of the target packet, the management device determines the transmission path of the target packet based on the mirrored packet of the target packet, that is, the management device determines the transmission path based on the target packet itself, and the reliability of the determined packet transmission path is high. In addition, the packet transmission path determining method provided in this application can implement the real-time restoration of the packet transmission path, and ensure the timeliness of determining the packet transmission path. In addition, because the network device obtains the target packet based on the access control list and performs the mirroring operation on the target packet, and the CPU of the network device does not need to participate in the entire process, the performance of the network device is not affected. Moreover, in the process of performing the mirroring operation on the target packet, the network device does not change the target packet such that the transmission path of the target packet is not affected.

Further, in this application, fault locating may be further implemented based on the packet transmission path. When performing fault locating, the management device first determines the breakpoint device in the transmission path, but the breakpoint device is not necessarily the faulty device. Therefore, both the breakpoint device in the normal flow path and the downstream device of the breakpoint device are used as to-be-determined faulty devices, and the actual faulty device is further determined in the to-be-determined faulty devices such that accuracy of fault locating can be improved. In addition, the faulty device can be determined by comparing the normal flow path with the abnormal flow path, and fault locating process is relatively simple and fast fault locating can be implemented. In addition, the management device may further determine the fault root cause based on the device data change information of the faulty device, to implement automatic root cause locating.

DESCRIPTION OF EMBODIMENTS

To make objectives, technical solutions, and advantages of this application clearer, the following further describes implementations of this application in detail with reference to the accompanying drawings.

Figure 1:
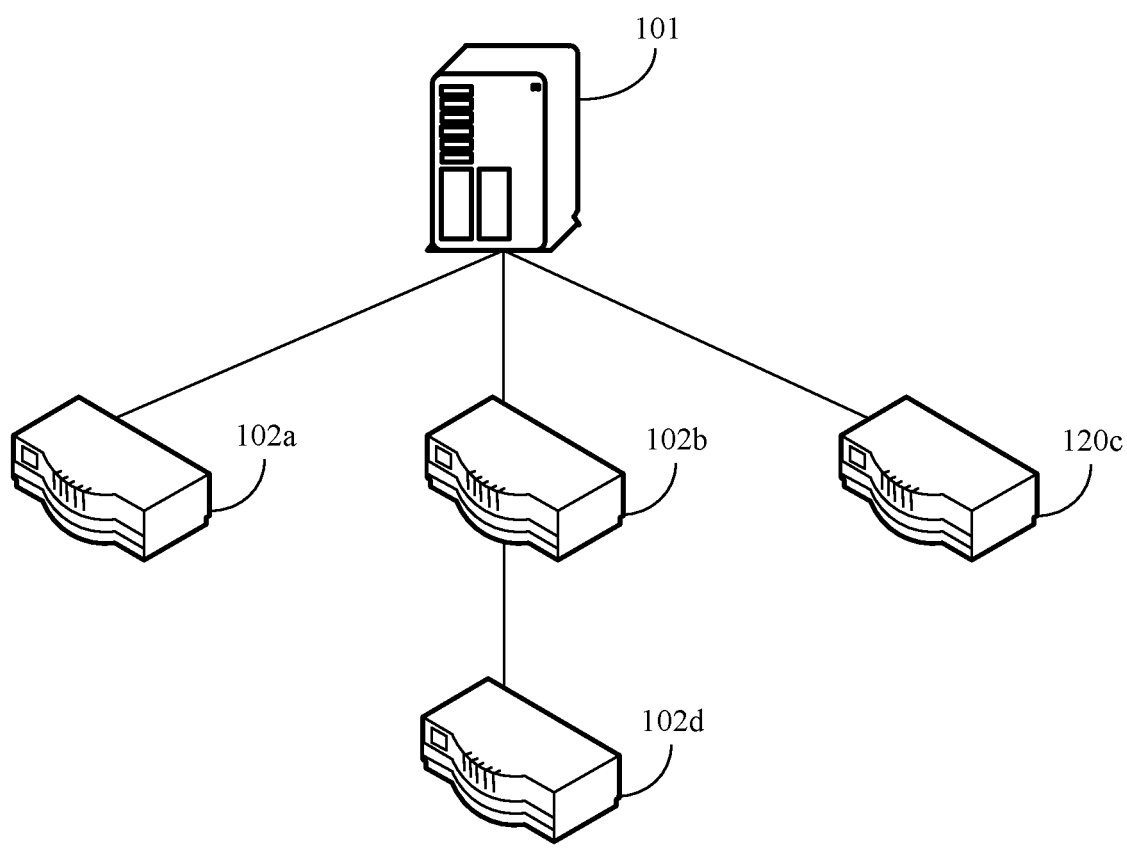
FIG. 1 is a schematic diagram of a structure of a packet transmission path determining system according to an embodiment of this application.

FIG. 1 is a schematic diagram of a structure of a packet transmission path determining system according to an embodiment of this application. As shown in FIG. 1, the packet transmission path determining system includes a management device 101 and a network device 102a to a network device 102d (which are collectively referred to as a network device 102) in a communication network. A quantity of network devices in FIG. 1 is merely used as an example, and is not intended to limit the communication network provided in this embodiment of this application.

The communication network provided in this embodiment of this application may be a data center network (DCN), a metropolitan area network, a wide area network, a campus network, a virtual local area network (VLAN), a virtual extensible local area network (VXLAN), or the like. A type of the communication network is not limited in this embodiment of this application.

Optionally, the management device 101 may be one server or a server cluster including two or more servers, or may be a cloud computing service center. The network device 102 may be a switch, a router, or the like. The management device 101 is connected to the network device 102 through a wired network or a wireless network. Optionally, the management device 101 may be directly connected to the network device 102. For example, as shown in FIG. 1, the management device 101 is directly connected to the network device 102a, the network device 102b, and the network device 102c. Alternatively, the management device 101 may be indirectly connected to the network device 102. For example, as shown in FIG. 1, the management device 101 is connected to the network device 102d through the network device 102b.

The network device 102 supports encapsulated remote switch port analyzer (ERSPAN) function, that is, a layer 3 remote traffic mirroring function. The network device 102 has an encapsulated remote mirroring source port, and the management device 101 has an encapsulated remote mirroring destination port. A mirrored packet generated by the network device 102 can be transmitted from the encapsulated remote mirror source port to the encapsulated remote mirror destination port. Optionally, the management device 101 includes a collector and an analyzer, and the collector has the encapsulated remote mirroring destination port. The collector can collect the mirrored packet generated by the network device 102, and transmit the collected mirrored packet to the analyzer such that the analyzer performs analysis based on the mirrored packet.

Figure 2:
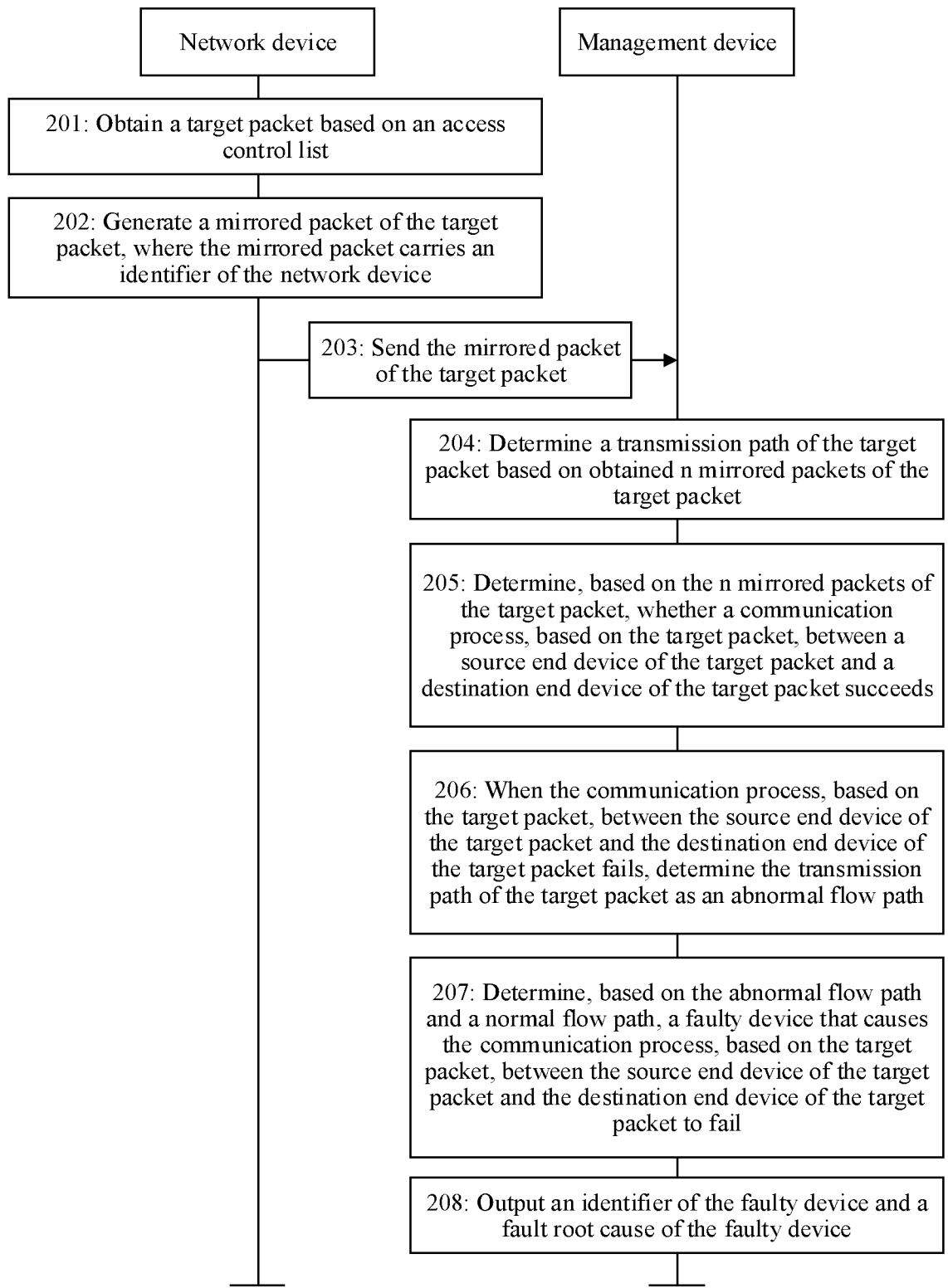
FIG. 2 is a flowchart of a packet transmission path determining method according to an embodiment of this application.

FIG. 2 is a flowchart of a packet transmission path determining method according to an embodiment of this application. The method may be applied to the packet transmission path determining system shown in FIG. 1. As shown in FIG. 2, the method includes the following steps.

Step 201: A network device obtains a target packet based on an access control list.

Optionally, the access control list (ACL) may be preconfigured in the network device. The access control list is an instruction list of a network device interface. An entry in the access control list usually includes two parts, for example, a filter and an action. When the network device obtains content defined in the filter through matching, an action defined in the action is performed. In this embodiment of this application, the target packet may be a TCP control packet. Types of TCP control packets are differentiated using TCP flags. Current TCP flags include the following six flags such as an urgent pointer (URG) flag, an acknowledgment (ACK) flag, a push (PSH) flag, a synchronize (SYN) flag, a finish (FIN) flag, and a reset (RST) flag. When SYN in the TCP flags is equal to 1, it indicates that the TCP control packet is used to establish a TCP connection. When FIN in the TCP flags is equal to 1, it indicates that the TCP control packet is used to disconnect a TCP connection. For example, the target packet may be a TCP control packet used to establish a TCP connection or a TCP control packet used to disconnect a TCP connection. For example, the following two entries may be configured in the access control list to obtain the target packet, where the two entries are as follows.

1. filter: (TCP flag: SYN=1), action: mirror; and
2. filter: (TCP flag: FIN=1), action: mirror.

The first entry is used to obtain, through matching, a TCP control packet whose SYN is equal to 1. The second entry is used to obtain, through matching, a TCP control packet whose FIN is equal to 1. "action: mirror" indicates that after a corresponding TCP control packet is obtained through matching, a mirroring operation is performed on the TCP control packet, and the mirroring operation includes actions in step 202 and step 203.

Step 202: The network device generates a mirrored packet of the target packet, where the mirrored packet comprises an identifier of the network device.

When N network devices in a communication network receive the target packet, each of the N network devices generates one mirrored packet of the target packet, where N is an integer greater than 1.

The identifier of the network device is used to uniquely identify the network device. Optionally, the identifier of the network device includes an IP address of the network device. The identifier of the network device that generates the mirrored packet is encapsulated in the mirrored packet such that a management device can determine a transmit end of the mirrored packet after receiving the mirrored packet.

Step 203: The network device sends the mirrored packet of the target packet to the management device.

Step 204: The management device determines a transmission path of the target packet based on obtained N mirrored packets of the target packet.

Each mirrored packet is generated by one of the N network devices that transmit the target packet.

Optionally, the target packet may be a TCP control packet used to establish a TCP connection or a TCP control packet used to disconnect a TCP connection. In a process of establishing the TCP connection between a source end device and a destination end device, the management device may determine a transmission path of the TCP control packet used to establish the TCP connection based on a plurality of mirrored packets of the TCP control packet used to establish the TCP connection. In a process of disconnecting the TCP connection between the source end device and the destination end device, the management device may determine a transmission path of the TCP control packet used to disconnect the TCP connection based on a plurality of mirrored packets of the TCP control packet used to disconnect the TCP connection.

In an optional embodiment of this application, an implementation process of step 204 includes a management device that determines a time sequence for the target packet in arriving at the N network devices based on time to live in the N mirrored packets and an identifier of a network device in each mirrored packet, to obtain the transmission path.

The time to live (TTL) of the packet is used to limit a maximum quantity of forwarding hops of the packet in the communication network. Each time layer 3 forwarding is performed on the packet, a TTL value in the packet is decreased by 1. Therefore, a larger TTL value in the mirrored packet indicates earlier time at which the target packet arrives at the network device that generates the mirrored packet. In this embodiment of this application, when layer 3 forwarding is performed on the target packet, the management device may determine the time sequence for the target packet in arriving at the N network devices based on the TTL in the N mirrored packets, to restore the transmission path of the target packet.

For example, the target packet is a TCP control packet used to establish a TCP connection. It is assumed that three network devices in the communication network receive the target packet, and the three network devices include a first network device whose IP address is 1.1.1.1, a second network device whose IP address is 2.2.2.2, and a third network device whose IP address is 3.3.3.3. After receiving the target packet, the first network device generates a first mirrored packet of the target packet, and sends the first mirrored packet to the management device, where a TTL value in the first mirrored packet is 63. After receiving the target packet, the second network device generates a second mirrored packet of the target packet, and sends the second mirrored packet to the management device, where a TTL value in the second mirrored packet is 64. After receiving the target packet, the third network device generates a third mirrored packet of the target packet, and sends the third mirrored packet to the management device, where a TTL value in the third mirrored packet is 62. The management device parses the first mirrored packet, the second mirrored packet, and the third mirrored packet, and sorts the three network devices based on the TTL values in the three mirrored packets, to obtain sequence numbers in the transmission path that are shown in Table 1.

TABLE 1

| Sequence number in the transmission path | IP | TTL | TCP flag |
| --- | --- | --- | --- |
| 1 | 2.2.2.2 | 64 | SYN = 1 |
| 2 | 1.1.1.1 | 63 | SYN = 1 |
| 3 | 3.3.3.3 | 62 | SYN = 1 |

It can be learned from Table 1 that the transmission path of the target packet in the communication network is the second network device→the first network device→the third network device.

In another optional embodiment of this application, an implementation process of step 204 includes a management device that determines a time sequence for the target packet in arriving at the N network devices based on a time sequence in receiving the N mirrored packets and an identifier of a network device in each mirrored packet, to obtain the transmission path.

Because there is a time sequence in which the N network devices receive the target packet, there is also a time sequence in which the N network devices generate the mirrored packets and send the mirrored packets to the management device. Therefore, earlier time at which the management device receives a mirrored packet may indicate earlier time at which the target packet arrives at a network device that generates the mirrored packet. When layer 2 forwarding is performed on the target packet, a TTL value of the target packet remains unchanged in a forwarding process. Therefore, the management device determines the time sequence for the target packet in arriving at the N network devices based on the time sequence in receiving the N mirrored packets, to restore a transmission path of the target packet forwarded at layer 3 or a transmission path of the target packet forwarded at layer 2.

Optionally, each time the management device receives one mirrored packet, a receiving moment of the mirrored packet is recorded. After receiving a plurality of mirrored packets, the management device sorts a plurality of network devices that respectively send the plurality of mirrored packets based on receiving moments of the plurality of mirrored packets, to restore the transmission path of the target packet. When the management device includes a collector and an analyzer, the collector is configured to receive a mirrored packet sent by the network device, set a receiving timestamp for the mirrored packet, and then transmit the mirrored packet and the receiving timestamp to the analyzer, and the analyzer restores the transmission path of the target packet based on a plurality of mirrored packets of the target packet and receiving timestamps of the plurality of mirrored packets.

Optionally, step 204 may alternatively be implemented with reference to the foregoing two optional embodiments, and includes a management device that obtains TTL in the N mirrored packets. If the N mirrored packets have different TTL, the management device determines the transmission path of the target packet using the implementation in the first optional embodiment. If the N mirrored packets have same TTL, the management device determines the transmission path of the target packet using the implementation in the second optional embodiment. In addition, if the mirrored packet sent by the network device comprises a generation timestamp of the mirrored packet, the management device may further determine the time sequence for the target packet in arriving at the N network devices based on generation timestamps of the mirrored packets. In this embodiment of this application, high-precision clock synchronization, for example, 1588 clock synchronization, may be deployed on the management device and each network device in the communication network, to ensure reliability of the restored packet transmission path.

According to the packet transmission path determining method provided in this embodiment of this application, after receiving the target packet, the network device in the communication network can generate the mirrored packet of the target packet, and send the mirrored packet to the management device. The management device determines the transmission path of the target packet based on the plurality of mirrored packets of the target packet. Because the mirrored packet of the target packet is essentially a duplicate packet of the target packet, the management device determines the transmission path of the target packet based on the mirrored packet of the target packet, that is, the management device determines the transmission path based on the target packet itself, and the reliability of the determined packet transmission path is high. In addition, the packet transmission path determining method provided in this embodiment of this application can implement real-time restoration of the packet transmission path, and ensure timeliness of determining the packet transmission path. In addition, because the network device obtains the target packet and performs the mirroring operation on the target packet based on the access control list, and a CPU of the network device does not need to participate in an entire process, performance of the network device is not affected. Moreover, in a process of performing the mirroring operation on the target packet, the network device does not change the target packet such that the transmission path of the target packet is not affected.

Optionally, when the target packet includes the TCP control packet, the management device may not only determine the transmission path of the target packet based on the N mirrored packets of the target packet, but also implement anomaly detection on the transmission path of the target packet. For an implementation process, refer to step 205 and step 206.

Step 205: The management device determines, based on the N mirrored packets of the target packet, whether a communication process, based on the target packet, between the source end device of the target packet and the destination end device of the target packet succeeds.

When the target packet does not arrive at the destination end device, or when the target packet arrives at the destination end device but the destination end device cannot respond to the target packet, the destination end device does not send, to the source end device, an acknowledgment packet used to indicate that the target packet is received. Therefore, in this embodiment of this application, when the management device does not receive a mirrored packet of the acknowledgment packet generated by the destination end device based on the target packet, the management device determines that the communication process, based on the target packet, between the source end device of the target packet and the destination end device of the target packet fails.

Optionally, if the target packet is a TCP control packet used to establish a TCP connection, that the management device determines whether the communication process, based on the target packet, between the source end device and the destination end device of the target packet succeeds includes a management device that determines whether the TCP connection is successfully established between the source end device and the destination end device based on the target packet. Alternatively, if the target packet is a TCP control packet used to disconnect a TCP connection, that the management device determines whether the communication process, based on the target packet, between the source end device and the destination end device of the target packet succeeds includes a management device that determines whether the TCP connection is successfully disconnected between the source end device and the destination end device based on the target packet.

For example, when the target packet is the TCP control packet used to establish the TCP connection, the network device sends mirrored packets of all packets whose TCP flag SYN is equal to 1 to the management device. It can be learned based on the "three-way handshake" mechanism that, in a process of establishing the TCP connection, the source end device sends a connection request packet to the destination end device, where the connection request packet is a TCP control packet whose TCP flag SYN is equal to 1. After receiving the connection request packet, the destination end device sends a connection acknowledgment packet to the source end device, where the connection acknowledgment packet is a TCP control packet whose TCP flag SYN is equal to 1 and TCP flag ACK is equal to 1. Therefore, after receiving a plurality of mirrored packets whose TCP flag SYN is equal to 1, the management device may determine whether a mirrored packet whose TCP flag SYN is equal to 1 and TCP flag ACK is equal to 1 is received within a preset time period, and determine whether the TCP connection is successfully established between the source end device of the target packet and the destination end device of the target packet.

Step 206: When the communication process, based on the target packet, between the source end device of the target packet and the destination end device of the target packet fails, the management device determines the transmission path of the target packet as an abnormal flow path.

Optionally, when the communication process, based on the target packet, between the source end device of the target packet and the destination end device of the target packet succeeds, the management device determines the transmission path of the target packet as a normal flow path.

In this embodiment of this application, after the management device determines the transmission path of the target packet as the abnormal flow path, fault locating may be further performed. For an implementation process, refer to step 207 and step 208.

Step 207: The management device determines, based on the abnormal flow path and a normal flow path, a faulty device that causes the communication process, based on the target packet, between the source end device of the target packet and the destination end device of the target packet to fail.

Optionally, the normal flow path is a historical path in which a communication process, based on a historical packet, between the source end device of the target packet and the destination end device of the target packet succeeds. The historical packet may be a packet transmitted before the target packet, for example, may be a historical TCP control packet transmitted before the target packet. The management device may store one or more normal flow paths between the source end device of the target packet and the destination end device of the target packet. The normal flow path may be obtained after determining, based on mirrored packets of a historical TCP control packet, that a communication process, based on the historical TCP control packet, between the source end device and the destination end device succeeds. When the management device includes a plurality of normal flow paths, the management device may determine the faulty device based on the abnormal flow path and a normal flow path whose generation moment is closest to a sending moment of the target packet. Alternatively, when the management device includes a plurality of normal flow paths, the management device may calculate a path matching degree between each normal flow path and the abnormal flow path, and determine the faulty device based on a normal flow path that has a highest path matching degree with the abnormal flow path. The path matching degree between the normal flow path and the abnormal flow path is positively correlated to a length of a target path, and the target path is a continuous path, starting from a source end of the normal flow path and a source end of the abnormal flow path, in which the normal flow path matches the abnormal flow path. For example, if the abnormal flow path is a-b-c-d-e, and the normal flow path is a-b-c-f, the target path is a-b-c.

In an optional embodiment of this application, the normal flow path includes m network devices. When the abnormal flow path is different from the normal flow path, an implementation process of step 207 includes the following steps.

S1: The management device sequentially compares m network devices in the normal flow path and the N network devices in the abnormal flow path, where m is an integer greater than 1.

Optionally, that the abnormal flow path is different from the normal flow path includes a quantity of network devices in the abnormal flow path is different from a quantity of network devices in the normal flow path, and/or a network device in the abnormal flow path is different from a network device in the normal flow path.

Figure 3:
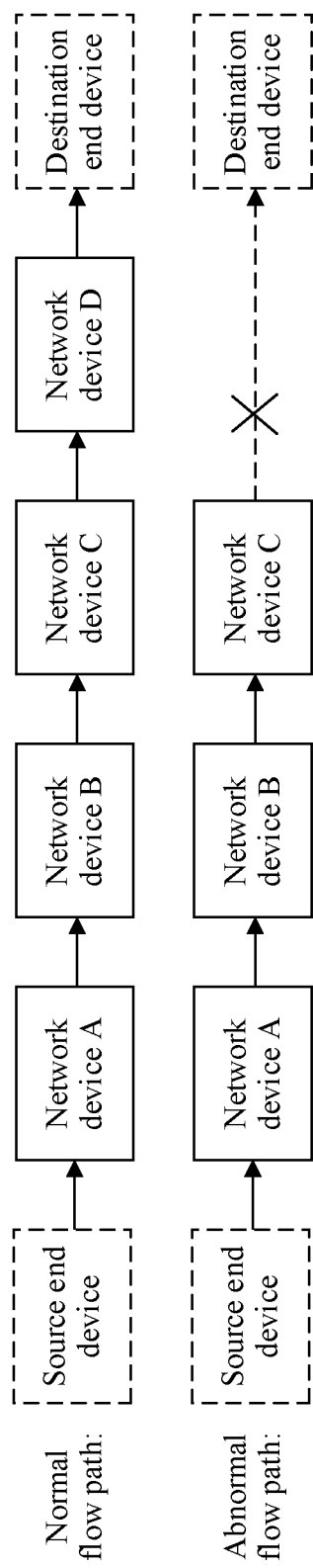
FIG. 3 is a schematic diagram of comparison between a normal flow path and an abnormal flow path according to an embodiment of this application.
Figure 4:
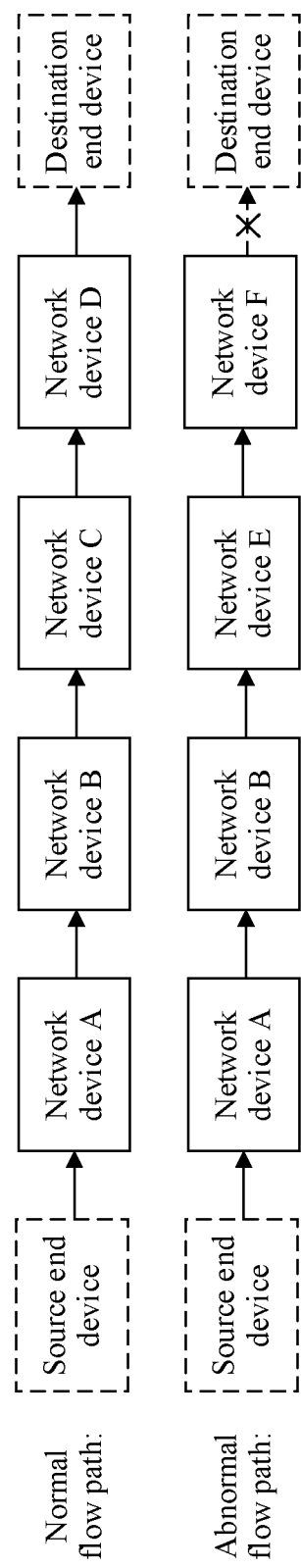
FIG. 4 is another schematic diagram of comparison between a normal flow path and an abnormal flow path according to an embodiment of this application.

For example, FIG. 3 is a schematic diagram of comparison between the normal flow path and the abnormal flow path according to an embodiment of this application. As shown in FIG. 3, a quantity of network devices in the abnormal flow path is different from a quantity of network devices in the normal flow path, the normal flow path sequentially includes a network device A, a network device B, a network device C, and a network device D, and the abnormal flow path sequentially includes the network device A, the network device B, and the network device C. FIG. 4 is another schematic diagram of comparison between the normal flow path and the abnormal flow path according to an embodiment of this application. As shown in FIG. 4, a network device in the abnormal flow path is different from a network device in the normal flow path, the normal flow path sequentially includes a network device A, a network device B, a network device C, and a network device D, and the abnormal flow path sequentially includes the network device A, the network device B, a network device E, and a network device F. The transmission path provided in this embodiment of this application does not include the source end device and the destination end device. Source end devices and destination end devices in the figures are merely used as examples for description.

S2: When the first network device in the normal flow path is different from the first network device in the abnormal flow path, the management device determines the first network device in the normal flow path as the faulty device.

S3: When the first i–1 network devices in the normal flow path are the same as the first i–1 network devices in the abnormal flow path, and a target condition is met, the management device determines an $(i-1)^{th}$ network device in the normal flow path as a first to-be-determined faulty device, determines an $i^{th}$ network device in the normal flow path as a second to-be-determined faulty device, and determines the faulty device in the first to-be-determined faulty device and the second to-be-determined faulty device, where $1<i \le m$, and $i-1 \le n$. The target condition is $n=i-1$, or $n>i-1$ and the $i^{th}$ network device in the normal flow path is different from an $i^{th}$ network device in the abnormal flow path.

In other words, S3 is as follows. When the first i–1 network devices in the normal flow path are the same as the first i–1 network devices in the abnormal flow path, and the abnormal flow path includes only i–1 network devices, the management device determines the $(i-1)^{th}$ network device in the normal flow path as the first to-be-determined faulty device, and determines the $i^{th}$ network device in the normal flow path as the second to-be-determined faulty device. Alternatively, when the first i–1 network devices in the normal flow path are the same as the first i–1 network devices in the abnormal flow path, the quantity of network devices in the abnormal flow path is greater than i–1, and the $i^{th}$ network device in the normal flow path is different from the $i^{th}$ network device in the abnormal flow path, the management device determines the $(i-1)^{th}$ network device in the normal flow path as the first to-be-determined faulty device; and determines the $i^{th}$ network device in the normal flow path as the second to-be-determined faulty device.

In this embodiment of this application, when different network devices exist in the abnormal flow path and the normal flow path, a network device in the normal flow path that is the last one in network devices the same as those in the abnormal flow path may be determined as a breakpoint device. Usually, the transmission path of the target packet should be the normal flow path. Because the breakpoint device exists in the normal flow path, the target packet is switched from the normal flow path to the abnormal flow path for transmission. Therefore, when the first i−1 network devices in the normal flow path are the same as the first i−1 network devices in the abnormal flow path, the quantity of network devices in the abnormal flow path is greater than i−1, and the $i^{th}$ network device in the normal flow path is different from the $i^{th}$ network device in the abnormal flow path, the management device may determine the $(i-1)^{th}$ network device (the breakpoint device) in the normal flow path as a to-be-determined faulty device.

For example, with reference to FIG. 3, the first three network devices in the normal flow path are the same as the first three network devices in the abnormal flow path, and the abnormal flow path includes only the three network devices. In this case, the management device may respectively determine the third network device (the network device C) and the fourth network device (the network device D) in the normal flow path as the first to-be-determined faulty device and the second to-be-determined faulty device. For another example, with reference to FIG. 4, the first two network devices in the normal flow path are the same as the first two network devices in the abnormal flow path, and the third network device (the network device C) in the normal flow path is different from the third network device (the network device E) in the abnormal flow path. In this case, the management device may respectively determine the second network device (the network device B) and the third network device (the network device C) in the normal flow path as the first to-be-determined faulty device and the second to-be-determined faulty device.

In this embodiment of this application, when performing fault locating, the management device first determines the breakpoint device in the transmission path (for example, the network device C in FIG. 3 and the network device B in FIG. 4). However, the breakpoint device is not necessarily the faulty device. Therefore, both the breakpoint device in the normal flow path and a downstream device of the breakpoint device are used as to-be-determined faulty devices, and an actual faulty device is further determined in the to-be-determined faulty devices such that accuracy of fault locating can be improved. In addition, the faulty device can be determined by comparing the normal flow path with the abnormal flow path, and a fault locating process is relatively simple and fast fault locating can be implemented.

Figure 5:
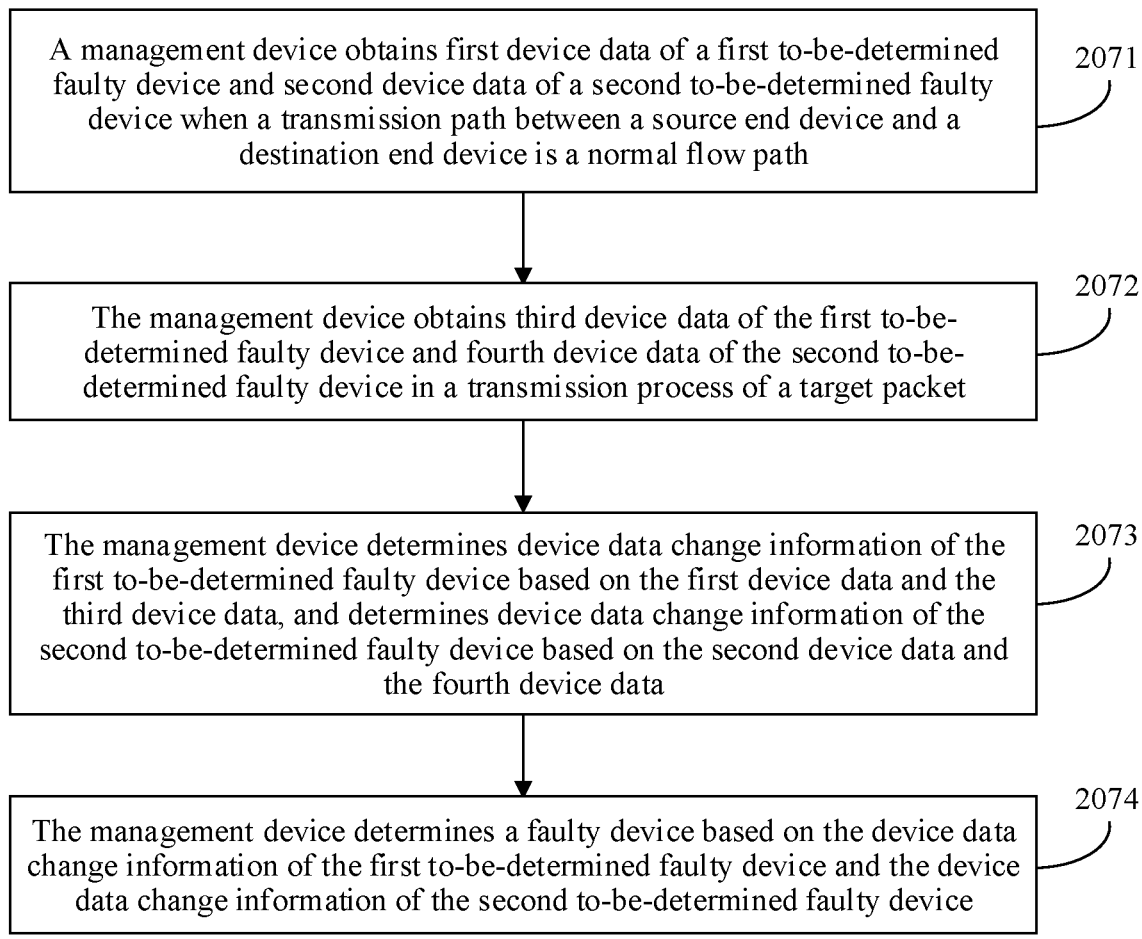
FIG. 5 is a flowchart of a method for determining a faulty device according to an embodiment of this application.

Optionally, FIG. 5 is a flowchart of a method in which the management device determines the faulty device in the first to-be-determined faulty device and the second to-be-determined faulty device according to an embodiment of this application. As shown in FIG. 5, the process includes the following steps.

Step 2071: The management device obtains first device data of the first to-be-determined faulty device and second device data of the second to-be-determined faulty device when the transmission path between the source end device and the destination end device is the normal flow path.

Optionally, the management device may obtain device data of each network device in the communication network. Common faults in the communication network include configuration fault, entry fault, hardware fault, congestion fault, attack fault, status fault, resource fault, non-network-side fault, and the like. The device data obtained by the management device may include at least one of management plane data, data plane data, or control plane data based on information required for fault locating. The management plane data includes a configuration file, alarm data, and the like. The data plane data includes an Address Resolution Protocol (ARP) table, a Media Access Control (MAC) table, a routing table, a tunnel status table (a VXLAN network), a port status, and the like. The control plane data includes CPU data, memory data, a Link Layer Discovery Protocol (LLDP) status, a Border Gateway Protocol (BGP) status, an Open Shortest Path First (OSPF) status, and the like. Both BGP and OSPF are routing protocols.

In this embodiment of this application, the management device may periodically collect device data of each network device in the communication network, and store the collected device data and a collection moment of the collected device data into a database. Alternatively, after being powered on, the network device sends device data of the network device and a collection moment of the device data to the management device. After a device status of the network device changes, the network device sends updated device data and a collection moment of the updated device data to the management device. The management device stores the device data and the collection moment of the device data that are sent by the network device into a database.

Optionally, an implementation process of step 2071 includes a management device that obtains the first device data of the first to-be-determined faulty device and the second device data of the second to-be-determined faulty device from the database based on restoration time of the normal flow path and collection moments of device data stored in the database.

Step 2072: The management device obtains third device data of the first to-be-determined faulty device and fourth device data of the second to-be-determined faulty device in a transmission process of the target packet.

Optionally, with reference to step 2071, the management device obtains the third device data of the first to-be-determined faulty device and the fourth device data of the second to-be-determined faulty device from the database based on transmission time of the target packet and the collection moments of the device data stored in the database.

Step 2073: The management device determines device data change information of the first to-be-determined faulty device based on the first device data and the third device data, and determines device data change information of the second to-be-determined faulty device based on the second device data and the fourth device data.

Optionally, the management device determines whether device data of the first to-be-determined faulty device changes by comparing the first device data and the third device data, and determines whether device data of the second to-be-determined faulty device changes by comparing the second device data and the fourth device data.

Step 2074: The management device determines the faulty device based on the device data change information of the first to-be-determined faulty device and the device data change information of the second to-be-determined faulty device.

In a first possible implementation, when the device data of the first to-be-determined faulty device does not change, and the device data of the second to-be-determined faulty device changes, the management device determines the second to-be-determined faulty device as the faulty device.

For example, the management device determines that a change of "destination IP host route deletion" exists in the second to-be-determined faulty device by comparing entries, configuration files, and alarm data in the second device data and the fourth device data. In this case, the management device determines the second to-be-determined faulty device as the faulty device, and a fault root cause is the "destination IP host route deletion".

In a second possible implementation, when the device data of the first to-be-determined faulty device changes, and the device data of the second to-be-determined faulty device does not change, the management device determines the first to-be-determined faulty device as the faulty device.

For example, the management device determines that a change of "access sub-interface deletion" exists in the first to-be-determined faulty device by comparing entries, configuration files, and alarm data in the first device data and the third device data. In this case, the management device determines the first to-be-determined faulty device as the faulty device, and a fault root cause is the "access sub-interface deletion".

In a third possible implementation, when both the device data of the first to-be-determined faulty device and the device data of the second to-be-determined faulty device change, the management device determines root cause information in the device data change information of the first to-be-determined faulty device and the device data change information of the second to-be-determined faulty device based on a preset determining rule, and determines a to-be-determined faulty device corresponding to the root cause information as the faulty device. The preset determining rule may be determined based on expert experience.

For example, the management device determines that a change of "access sub-interface deletion" exists in the first to-be-determined faulty device by comparing entries, configuration files, and alarm data in the first device data and the third device data, and the management device determines that a change of "destination IP host route deletion" exists in the second to-be-determined faulty device by comparing entries, configuration files, and alarm data in the second device data and the fourth device data. The following rule is defined in the preset determining rule. "Access sub-interface deletion" leads to "destination IP host route deletion". In this case, the management device determines that the "access sub-interface deletion" is the fault root cause, and determines the first to-be-determined faulty device as the faulty device.

In this embodiment of this application, the management device may implement automatic root cause locating when performing fault locating. It should be noted that the device data change information of the network device determined by the management device may be further used for a service scenario such as network monitoring and real-time network status analysis. This is not limited in this embodiment of this application.

In another optional embodiment of this application, when the abnormal flow path is the same as the normal flow path, an implementation process of step 207 includes a management device that determines the last network device in the normal flow path and the destination end device as to-be-determined faulty devices. When determining that the last network device is not faulty, the management device determines the destination end device as the faulty device.

Optionally, the management device determines device data change information of the last network device based on device data of the last network device when the transmission path between the source end device and the destination end device is the normal flow path and device data of the last network device in the transmission process of the target packet. If device data of the last network device does not change, the management device determines that the last network device is not faulty. In this case, the management device determines the destination end device as the faulty device. If device data of the last network device changes, the management device determines the last network device as the faulty device.

Step 208: The management device outputs an identifier of the faulty device and a fault root cause of the faulty device.

The fault root cause of the faulty device is obtained based on device data change information of the faulty device. Optionally, the management device may transmit the identifier of the faulty device and the fault root cause of the faulty device to a display device for display. Alternatively, when the management device has a display function, the identifier of the faulty device and the fault root cause of the faulty device may be displayed on the management device such that operation and maintenance personnel can view and rectify the fault.

Optionally, the management device may further dynamically generate a network physical topology based on the stored packet transmission path with reference to LLDP status information, and present the packet transmission path to the operation and maintenance personnel.

A sequence of the steps in the packet transmission path determining method provided in this embodiment of this application may be properly adjusted. For example, step 204 and step 205 may be performed simultaneously. A step may also be correspondingly added or removed based on a situation. Any variation method readily figured out by a person skilled in the art within the technical scope disclosed in this application shall fall within the protection scope of this application. Therefore, details are not described herein.

In conclusion, according to the packet transmission path determining method provided in this embodiment of this application, after receiving the target packet, the network device in the communication network can generate the mirrored packet of the target packet, and send the mirrored packet to the management device. The management device determines the transmission path of the target packet based on the plurality of mirrored packets of the target packet. Because the mirrored packet of the target packet is essentially a duplicate packet of the target packet, the management device determines the transmission path of the target packet based on the mirrored packet of the target packet, that is, the management device determines the transmission path based on the target packet itself, and the reliability of the determined packet transmission path is high. In addition, the packet transmission path determining method provided in this embodiment of this application can implement the real-time restoration of the packet transmission path, and ensure the timeliness of determining the packet transmission path. In addition, because the network device obtains the target packet and performs the mirroring operation on the target packet based on the access control list, and the CPU of the network device does not need to participate in the entire process, the performance of the network device is not affected. Moreover, in the process of performing the mirroring operation on the target packet, the network device does not change the target packet such that the transmission path of the target packet is not affected.

Further, in this embodiment of this application, fault locating may be further implemented based on the packet transmission path. When performing fault locating, the management device first determines the breakpoint device in the transmission path, but the breakpoint device is not necessarily the faulty device. Therefore, both the breakpoint device in the normal flow path and the downstream device of the breakpoint device are used as to-be-determined faulty devices, and the actual faulty device is further determined in the to-be-determined faulty devices such that the accuracy of fault locating can be improved. In addition, the faulty device can be determined by comparing the normal flow path with the abnormal flow path, and fault locating process is relatively simple and fast fault locating can be implemented. In addition, the management device may further determine the fault root cause based on the device data change information of the faulty device, to implement automatic root cause locating.

Figure 6:
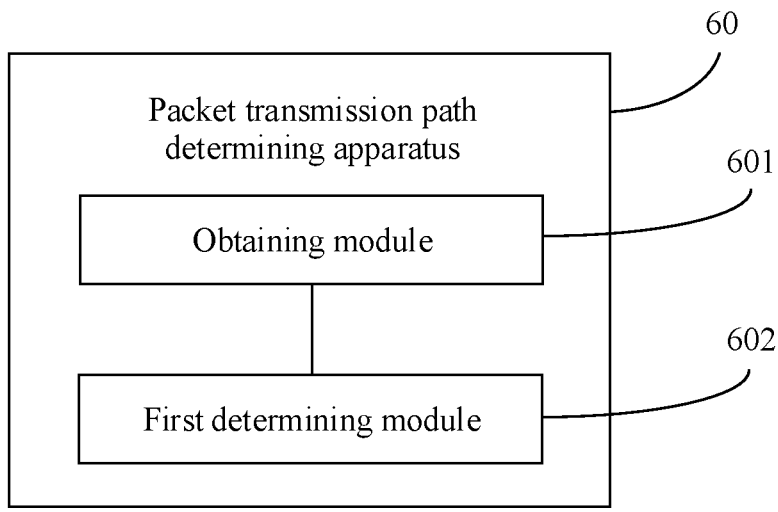
FIG. 6 is a schematic diagram of a structure of a packet transmission path determining apparatus according to an embodiment of this application.

FIG. 6 is a schematic diagram of a structure of a packet transmission path determining apparatus according to an embodiment of this application. The apparatus may be used in the management device 101 in the packet transmission path determining system shown in FIG. 1. As shown in FIG. 6, the apparatus 60 includes an obtaining module 601 configured to obtain N mirrored packets of a target packet, where each mirrored packet is generated by one of N network devices that transmit the target packet, each mirrored packet comprises an identifier of the network device that generates the mirrored packet, and N is an integer greater than 1; and a first determining module 602 configured to determine a transmission path of the target packet based on the N mirrored packets.

In conclusion, according to the packet transmission path determining apparatus provided in this embodiment of this application, after receiving the target packet, the network device in a communication network can generate the mirrored packet of the target packet, and send the mirrored packet to the management device. The management device determines, through the first determining module, the transmission path of the target packet based on a plurality of mirrored packets of the target packet. Because the mirrored packet of the target packet is essentially a duplicate packet of the target packet, the management device determines the transmission path of the target packet based on the mirrored packet of the target packet, that is, the management device determines the transmission path based on the target packet itself, and reliability of the determined packet transmission path is high. In addition, this embodiment of this application implements real-time restoration of the packet transmission path, and ensures timeliness of determining the packet transmission path.

In an optional embodiment of this application, the first determining module 602 is configured to determine, based on the time to live in the N mirrored packets and the identifier of the network device in each mirrored packet, a time sequence at which the target packets arrives at the N network devices, to obtain the transmission path.

In another optional embodiment of this application, the first determining module 602 is configured to determine, based on a time sequence of receiving the N mirrored packets and the identifier of the network device in each mirrored packet, a time sequence at which the target packets arrives at the N network devices, to obtain the transmission path.

Figure 7:
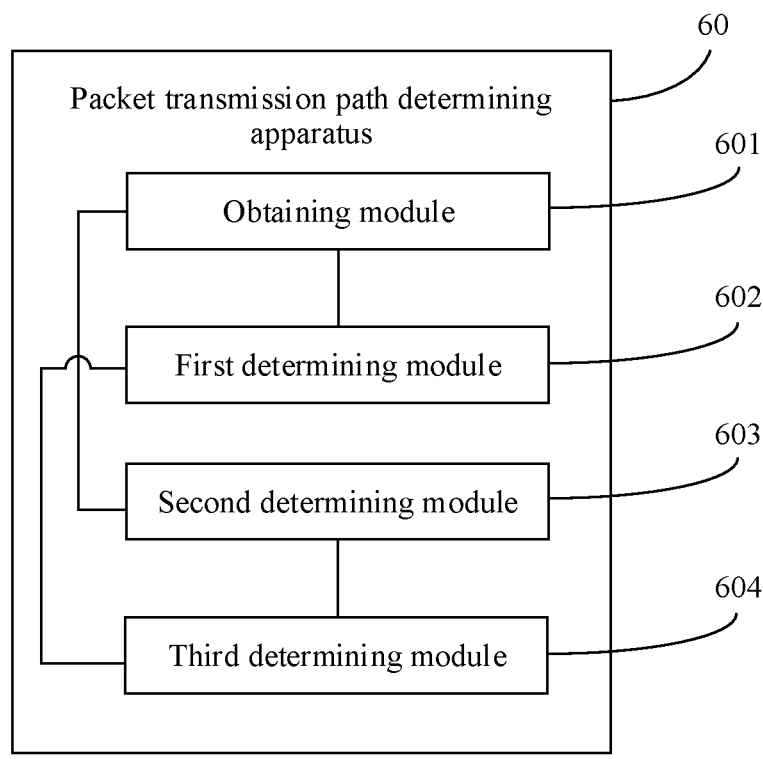
FIG. 7 is a schematic diagram of a structure of another packet transmission path determining apparatus according to an embodiment of this application.

Optionally, the target packet is a transmission control protocol TCP control packet. As shown in FIG. 7, the apparatus 60 further includes a second determining module 603 configured to determine, based on the N mirrored packets, whether a communication process, based on the target packet, between a source end device of the target packet and a destination end device of the target packet succeeds; and a third determining module 604 configured to determine the transmission path as an abnormal flow path when the communication process, based on the target packet, between the source end device and the destination end device fails.

Optionally, the target packet is the TCP control packet, and the communication process based on the target packet includes establishing a TCP connection based on the target packet or disconnecting a TCP connection based on the target packet.

Figure 8:
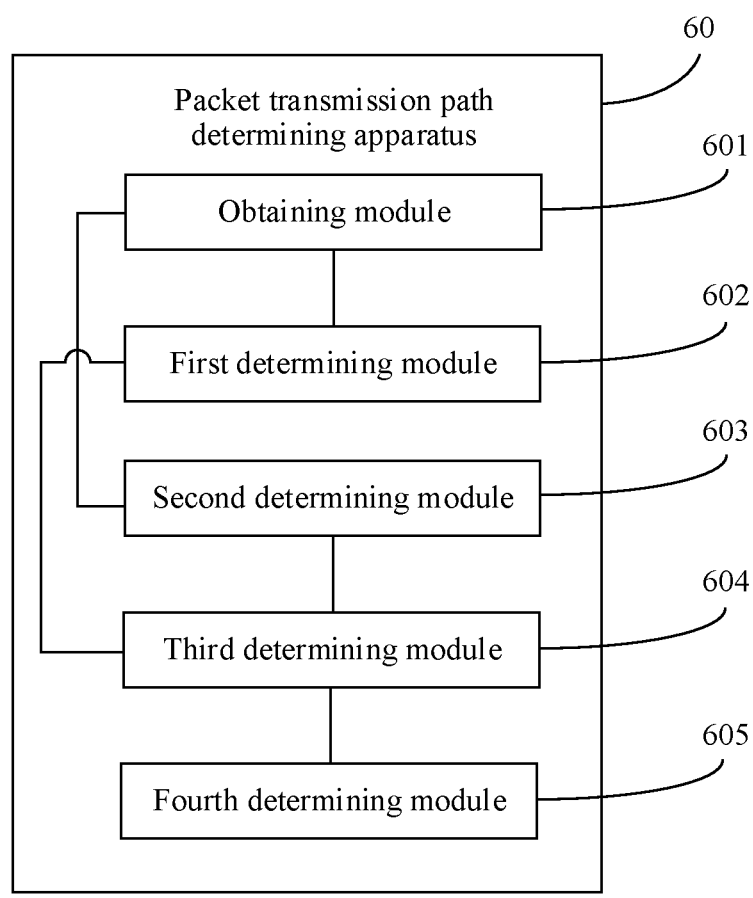
FIG. 8 is a schematic diagram of a structure of still another packet transmission path determining apparatus according to an embodiment of this application.

Optionally, as shown in FIG. 8, the apparatus 60 further includes a fourth determining module 605 configured to determine, based on the abnormal flow path and a normal flow path, a faulty device that causes the communication process, based on the target packet, between the source end device and the destination end device to fail, where the normal flow path is a historical path in which a communication process, based on a historical packet, between the source end device and the destination end device succeeds.

Optionally, when the abnormal flow path is different from the normal flow path, the fourth determining module 605 is configured to, when the first network device in the normal flow path is different from the first network device in the abnormal flow path, determine the first network device in the normal flow path as the faulty device; and when the first i−1 network devices in the normal flow path are the same as the first i−1 network devices in the abnormal flow path, and a target condition is met, determine an $(i-1)^{th}$ network device in the normal flow path as a first to-be-determined faulty device, determine an $i^{th}$ network device in the normal flow path as a second to-be-determined faulty device, and determine the faulty device in the first to-be-determined faulty device and the second to-be-determined faulty device, where 1<i≤m, i−1≤n, and m is a quantity of network devices in the normal flow path, where the target condition is n=i−1, or n>i−1 and the $i^{th}$ network device in the normal flow path is different from an $i^{th}$ network device in the abnormal flow path.

Optionally, the fourth determining module 605 is configured to obtain first device data of the first to-be-determined faulty device and second device data of the second to-be-determined faulty device when the transmission path between the source end device and the destination end device is the normal flow path; obtain third device data of the first to-be-determined faulty device and fourth device data of the second to-be-determined faulty device in a transmission process of the target packet; determine device data change information of the first to-be-determined faulty device based on the first device data and the third device data, and determine device data change information of the second to-be-determined faulty device based on the second device data and the fourth device data; and determine the faulty device based on the device data change information of the first to-be-determined faulty device and the device data change information of the second to-be-determined faulty device, where the first device data, the second device data, the third device data, and the fourth device data all include at least one of management plane data, data plane data, or control plane data.

Optionally, the fourth determining module 605 is configured to, when device data of the first to-be-determined faulty device does not change, and device data of the second to-be-determined faulty device changes, determine the second to-be-determined faulty device as the faulty device; or when device data of the first to-be-determined faulty device changes, and device data of the second to-be-determined faulty device does not change, determine the first to-be-determined faulty device as the faulty device.

Optionally, the fourth determining module 605 is configured to, when both device data of the first to-be-determined faulty device and device data of the second to-be-determined faulty device change, determine root cause information in the device data change information of the first to-be-determined faulty device and the device data change information of the second to-be-determined faulty device based on a preset determining rule, and determine a to-be-determined faulty device corresponding to the root cause information as the faulty device.

Figure 9:
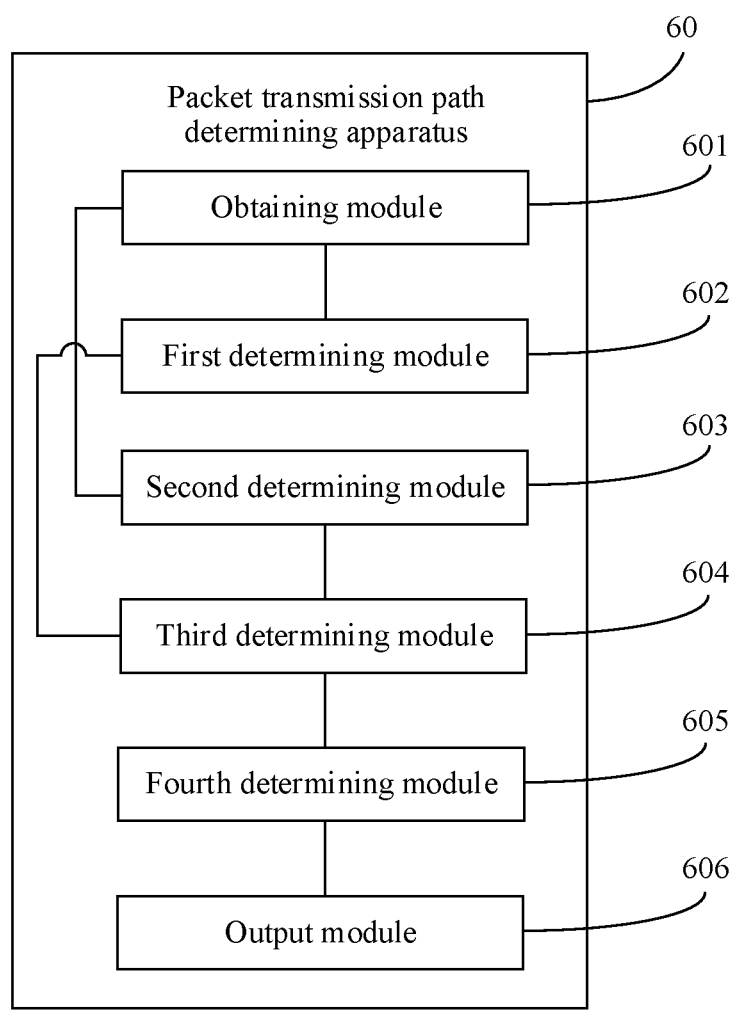
FIG. 9 is a schematic diagram of a structure of yet another packet transmission path determining apparatus according to an embodiment of this application.

Optionally, as shown in FIG. 9, the apparatus 60 further includes an output module 606 configured to output an identifier of the faulty device and a fault root cause of the faulty device, where the fault root cause of the faulty device is obtained based on device data change information of the faulty device.

Optionally, when the abnormal flow path is the same as the normal flow path, the fourth determining module 605 is configured to determine the last network device in the normal flow path and the destination end device as to-be-determined faulty devices; and when determining that the last network device is not faulty, determine the destination end device as the faulty device.

In conclusion, according to the packet transmission path determining apparatus provided in this embodiment of this application, after receiving the target packet, the network device in the communication network can generate the mirrored packet of the target packet, and send the mirrored packet to the management device. The management device determines, through the first determining module, the transmission path of the target packet based on the plurality of mirrored packets of the target packet. Because the mirrored packet of the target packet is essentially a duplicate packet of the target packet, the management device determines the transmission path of the target packet based on the mirrored packet of the target packet, that is, the management device determines the transmission path based on the target packet itself, and the reliability of the determined packet transmission path is high. In addition, this embodiment of this application implements the real-time restoration of the packet transmission path, and ensures the timeliness of determining the packet transmission path. Further, in this embodiment of this application, fault locating may be further implemented based on the packet transmission path. When performing fault locating, the management device first determines a breakpoint device in the transmission path, but the breakpoint device is not necessarily the faulty device. Therefore, both the breakpoint device in the normal flow path and a downstream device of the breakpoint device are used as to-be-determined faulty devices, and an actual faulty device is further determined in the to-be-determined faulty devices such that accuracy of fault locating can be improved. In addition, the faulty device can be determined by comparing the normal flow path with the abnormal flow path, and a fault locating process is relatively simple and fast fault locating can be implemented. In addition, the management device may further determine the fault root cause based on the device data change information of the faulty device, to implement automatic root cause locating.

Figure 10:
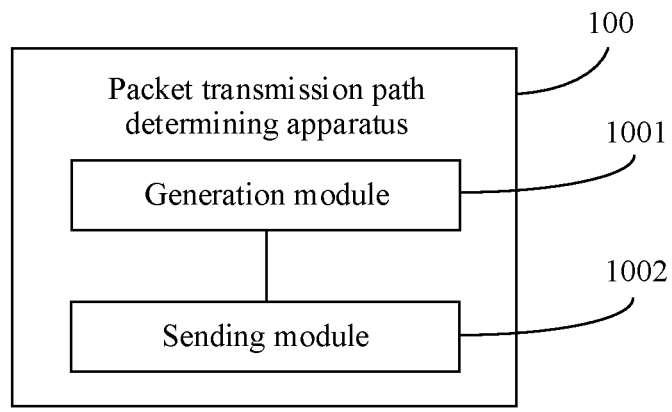
FIG. 10 is a schematic diagram of a structure of a packet transmission path determining apparatus according to another embodiment of this application.

FIG. 10 is a schematic diagram of a structure of a packet transmission path determining apparatus according to another embodiment of this application. The apparatus may be used in the network device 102 in the packet transmission path determining system shown in FIG. 1. As shown in FIG. 10, the apparatus 100 includes a generation module 1001 configured to generate a mirrored packet of a target packet after receiving the target packet, where the mirrored packet comprises an identifier of a network device; and a sending module 1002 configured to send the mirrored packet to a management device such that the management device determines a transmission path of the target packet.

In conclusion, according to the packet transmission path determining apparatus provided in this embodiment of this application, after receiving the target packet, the network device in a communication network can generate the mirrored packet of the target packet through the generation module, and send the mirrored packet to the management device through the sending module. The management device determines the transmission path of the target packet based on a plurality of mirrored packets of the target packet. Because the mirrored packet of the target packet is essentially a duplicate packet of the target packet, the management device determines the transmission path of the target packet based on the mirrored packet of the target packet, that is, the management device determines the transmission path based on the target packet itself, and reliability of the determined packet transmission path is high. In addition, this embodiment of this application implements real-time restoration of the packet transmission path, and ensures timeliness of determining the packet transmission path.

Figure 11:
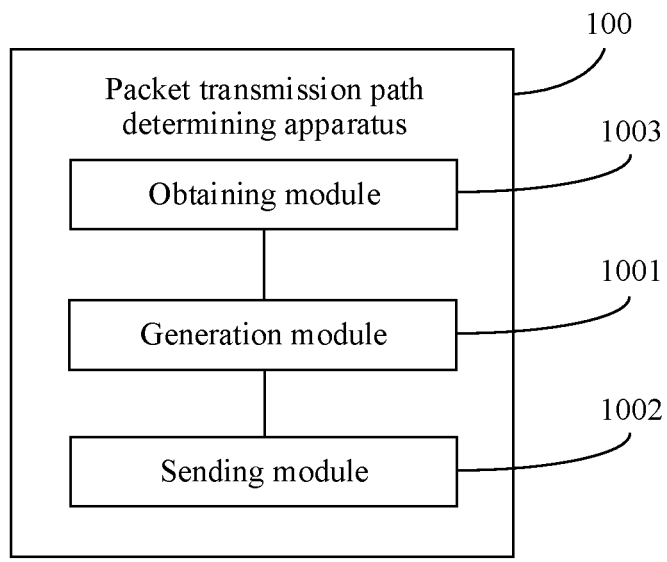
FIG. 11 is a schematic diagram of a structure of another packet transmission path determining apparatus according to another embodiment of this application.

Optionally, as shown in FIG. 11, the apparatus 100 further includes an obtaining module 1003 configured to obtain the target packet based on an access control list in the network device.

Optionally, the target packet includes a transmission control protocol TCP control packet.

Optionally, the sending module 1002 is further configured to send updated device data to the management device after a device status of the network device changes, where the device data includes at least one of management plane data, data plane data, or control plane data.

In conclusion, according to the packet transmission path determining apparatus provided in this embodiment of this application, after receiving the target packet, the network device in the communication network can generate the mirrored packet of the target packet through the generation module, and send the mirrored packet to the management device through the sending module. The management device determines the transmission path of the target packet based on the plurality of mirrored packets of the target packet. Because the mirrored packet of the target packet is essentially a duplicate packet of the target packet, the management device determines the transmission path of the target packet based on the mirrored packet of the target packet, that is, the management device determines the transmission path based on the target packet itself, and the reliability of the determined packet transmission path is high. In addition, this embodiment of this application implements the real-time restoration of the packet transmission path, and ensures the timeliness of determining the packet transmission path. In addition, because the network device obtains the target packet based on the access control list and performs a mirroring operation on the target packet, a CPU of the network device does not need to participate in an entire process, performance of the network device is not affected. Moreover, in a process of performing the mirroring operation on the target packet, the network device does not change the target packet, and the transmission path of the target packet is not affected.

Figure 12:
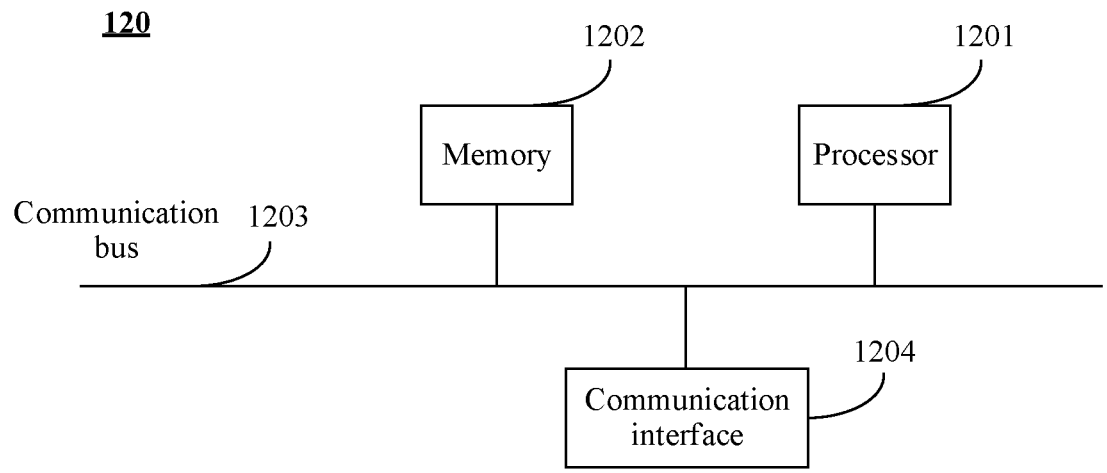
FIG. 12 is a block diagram of a network device according to an embodiment of this application.

FIG. 12 is a block diagram of a network device according to an embodiment of this application. As shown in FIG. 12, the network device 120 includes a processor 1201 and a memory 1202.

The memory 1202 is configured to store a computer program, where the computer program includes program instructions.

The processor 1201 is configured to invoke the computer program to implement the steps performed by the network device in the packet transmission path determining method shown in FIG. 2.

Optionally, the network device 120 further includes a communication bus 1203 and a communication interface 1204.

The processor 1201 includes one or more processing cores, and the processor 1201 executes various functional applications and performs data processing by running the computer program.

The memory 1202 may be configured to store the computer program. Optionally, the memory may store an operating system and at least one application program unit required by a function. The operating system may be an operating system such as a real time operating system (e.g., real time executive (RTX)), Linux®, Unix®, Windows®, or OS X.

There may be a plurality of communication interfaces 1204, and the communication interface 1204 is configured to communicate with another device, for example, communicate with a management device.

The memory 1202 and the communication interface 1204 are separately connected to the processor 1201 through the communication bus 1203.

Figure 13:
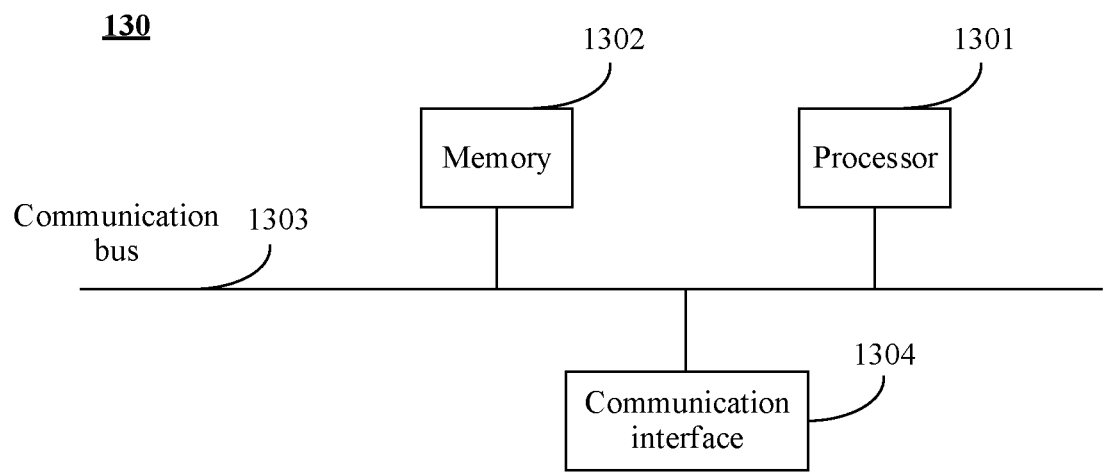
FIG. 13 is a block diagram of a management device according to an embodiment of this application.

FIG. 13 is a block diagram of a management device according to an embodiment of this application. As shown in FIG. 13, the management device 130 includes a processor 1301 and a memory 1302.

The memory 1302 is configured to store a computer program, where the computer program includes program instructions.

The processor 1301 is configured to invoke the computer program to implement the steps performed by the management device in the packet transmission path determining method shown in FIG. 2.

Optionally, the management device 130 further includes a communication bus 1303 and a communication interface 1304.

The processor 1301 includes one or more processing cores, and the processor 1301 executes various functional applications and performs data processing by running the computer program.

The memory 1302 may be configured to store the computer program. Optionally, the memory may store an operating system and at least one application program unit required by a function. The operating system may be an operating system such as a real time operating system (e.g., RTX), Linux, Unix, Windows, or OS X.

There may be a plurality of communication interfaces 1304, and the communication interface 1304 is configured to communicate with another device, for example, communicate with a network device.

The memory 1302 and the communication interface 1304 are separately connected to the processor 1301 through the communication bus 1303.

The embodiments of this application further provide a computer storage medium. The computer storage medium stores instructions. When the instructions are executed by a processor of a network device, the steps performed by the network device in the packet transmission path determining method shown in FIG. 2 are implemented. Alternatively, when the instructions are executed by a processor of a management device, the steps performed by the management device in the packet transmission path determining method shown in FIG. 2 are implemented.

A person of ordinary skill in the art may understand that all or some of the steps in the embodiments may be implemented by hardware or a program instructing related hardware. The program may be stored in a computer-readable storage medium. The storage medium may be a read-only memory, a magnetic disk, an optical disc, or the like.

In the embodiments of this application, the terms "first", "second", and "third" are merely used for description, but cannot be understood as an indication or implication of relative importance. The term "at least one" means one or more, and the term "a plurality of" means two or more, unless otherwise expressly limited.

The term "and/or" in this application describes only an association relationship for describing associated objects and indicates that three relationships may exist. For example, A and/or B may indicate the following three cases. Only A exists, both A and B exist, and only B exists. In addition, the character "/" in this specification usually indicates an "or" relationship between the associated objects.

The foregoing descriptions are merely optional embodiments of this application, but are not intended to limit this application. Any modification, equivalent replacement, or improvement made within the concept and principle of this application should fall within the protection scope of this application.

What is claimed is:

1. A packet transmission path determining method of a management device, wherein the packet transmission path determining method comprises:

receiving N mirrored packets of a target packet, wherein each of the N mirrored packets is from one of N network devices that transmits the target packet and is based on a transmission control protocol (TCP) synchronize (SYN) flag in the target packet, wherein the target packet is a TCP SYN packet comprising the TCP SYN flag, wherein each of the N mirrored packets comprises an identifier of a respective network device of the N network devices, wherein a source end device of the target packet and a destination end device of the target packet are separately connected to a communication network to which the N network devices belong, wherein the target packet originates from the source end device and that is sent to the destination end device, and wherein N is an integer greater than 1;

determining a transmission path of the target packet based on the N mirrored packets;

determining, using the N mirrored packets and based on the target packet, whether a communication process between the source end device of the target packet and the destination end device of the target packet has succeeded;

determining the transmission path as an abnormal flow path when the communication process has failed based on the target packet;

determining, based on the abnormal flow path and a normal flow path, a faulty device that causes the communication process to fail based on the target packet, wherein the normal flow path is a historical path in which the communication process has succeeded; and when the abnormal flow path is different from the normal flow path, determining, based on the abnormal flow path and the normal flow path, the faulty device that causes the communication process, based on the target packet, between the source end device and the destination end device to fail comprises:

determining a first network device in the normal flow path as the faulty device when the first network device in the normal flow path is different from a first network device in the abnormal flow path; and determining an (i−1)th network device in the normal flow path as a first to-be-determined faulty device, an $i^{th}$ network device in the normal flow path as a second to-be-determined faulty device, and the faulty device in the first to-be-determined faulty device and the second to-be-determined faulty device when a first i−1 network devices in the normal flow path are same as a second i−1 network devices in the abnormal flow path and a target condition is met, wherein 1<i≤M, i−1≤N, and M is a quantity of network devices in the normal flow path, and wherein the target condition includes N=i−1, or N>i−1 and the $i^{th}$ network device in the normal flow path is different from an $i^{th}$ network device in the abnormal flow path.

2. The packet transmission path determining method of claim 1, wherein determining the transmission path based on the N mirrored packets comprises:
   determining, based on a time to live in the N mirrored packets and the identifier, a time sequence at which the target packet arrives at the N network devices; and
   obtaining the transmission path responsive to determining the time sequence.

3. The packet transmission path determining method of claim 1, wherein determining the transmission path based on the N mirrored packets comprises:
   determining, based on a time sequence of receiving the N mirrored packets and the identifier, a time sequence at which the target packet arrives at the N network devices; and
   obtaining the transmission path responsive to determining the time sequence at which the target packet arrives at the N network devices.

4. The packet transmission path determining method of claim 1, wherein the target packet is a TCP control packet, and wherein determining whether the communication process has succeeded based on the target packet comprises establishing a TCP connection based on the target packet or disconnecting a TCP connection based on the target packet.

5. The packet transmission path determining method of claim 1, wherein when the abnormal flow path is same as the normal flow path, determining, based on the abnormal flow path and the normal flow path, the faulty device that causes the communication process, based on the target packet, between the source end device and the destination end device to fail comprises:
   determining a last network device in the normal flow path and the destination end device as to-be-determined faulty devices; and
   when determining that the last network device is not faulty, determining the destination end device as the faulty device.

6. The packet transmission path determining method of claim 1, further comprising outputting an identifier of the faulty device and a fault root cause of the faulty device, wherein the fault root cause of the faulty device is based on device data change information of the faulty device.

7. The packet transmission path determining method of claim 1, wherein determining the faulty device in the first to-be-determined faulty device and the second to-be-determined faulty device comprises:
   obtaining first device data of the first to-be-determined faulty device and second device data of the second to-be-determined faulty device when the transmission path between the source end device and the destination end device is the normal flow path;
   obtaining third device data of the first to-be-determined faulty device and fourth device data of the second to-be-determined faulty device in a transmission process of the target packet;
   determining device data change information of the first to-be-determined faulty device based on the first device data and the third device data, and device data change information of the second to-be-determined faulty device based on the second device data and the fourth device data; and
   determining the faulty device based on the device data change information of the first to-be-determined faulty device and the device data change information of the second to-be-determined faulty device, wherein the first device data, the second device data, the third device data, and the fourth device data all comprise at least one of management plane data, data plane data, or control plane data.

8. The packet transmission path determining method of claim 7, wherein determining the faulty device based on the device data change information of the first to-be-determined faulty device and the device data change information of the second to-be-determined faulty device comprises:
   determining the second to-be-determined faulty device as the faulty device when device data of the first to-be-determined faulty device does not change and device data of the second to-be-determined faulty device changes; or
   determining the first to-be-determined faulty device as the faulty device when device data of the first to-be-determined faulty device changes, and device data of the second to-be-determined faulty device does not change.

9. The packet transmission path determining method of claim 7, wherein determining the faulty device based on the device data change information of the first to-be-determined faulty device and the device data change information of the second to-be-determined faulty device comprises:
   determining root cause information in the device data change information of the first to-be-determined faulty device and the device data change information of the second to-be-determined faulty device based on a preset determining rule when first device data of the first to-be-determined faulty device and second device data of the second to-be-determined faulty device change; and
   determining a to-be-determined faulty device corresponding to the root cause information as the faulty device.

10. A management device, comprising:
   a processor; and
   a memory coupled to the processor and configured to store instructions that when executed by the processor cause the management device to:
      receive N mirrored packets of a target packet, wherein each of the N mirrored packets is from one of N network devices that transmits the target packet and is based on a transmission control protocol (TCP) flag in the target packet, wherein the target packet is a TCP synchronize (SYN) packet comprising the TCP flag, wherein each of the N mirrored packets comprises an identifier of a respective network device of the N network devices, wherein a source end device of the target packet and a destination end device of the target packet are separately connected to a communication network to which the N network devices belong, wherein the target packet originates from the source end device and that is sent to the destination end device, and wherein N is an integer greater than 1;
determine a transmission path of the target packet based on the N mirrored packets;
determine, using the N mirrored packets and based on the target packet, whether a communication process between the source end device of the target packet and the destination end device of the target packet has succeeded;
determine the transmission path as an abnormal flow path when the communication process has failed based on the target packet;
determine, based on the abnormal flow path and a normal flow path, a faulty device that causes the communication process to fail based on the target packet, wherein the normal flow path is a historical path in which the communication process has succeeded; and
when the abnormal flow path is different from the normal flow path, determine, based on the abnormal flow path and the normal flow path, the faulty device that causes the communication process, based on the target packet, between the source end device and the destination end device to fail comprises:
determine a first network device in the normal flow path as the faulty device when the first network device in the normal flow path is different from a first network device in the abnormal flow path; and
determine an $(i-1)^{th}$ network device in the normal flow path as a first to-be-determined faulty device, an $i^{th}$ network device in the normal flow path as a second to-be-determined faulty device, and the faulty device in the first to-be-determined faulty device and the second to-be-determined faulty device when a first i−1 network devices in the normal flow path are same as a second i−1 network devices in the abnormal flow path and a target condition is met, wherein 1<i≤M, i−1≤N, and M is a quantity of network devices in the normal flow path, and wherein the target condition includes N=i−1, or N>i−1 and the ith network device in the normal flow path is different from an ith network device in the abnormal flow path.

11. The management device of claim 10, wherein when executed by the processor, the instructions further cause the management device to:
determine, based on a time to live in the N mirrored packets and the identifier, a time sequence at which the target packet arrives at the N network devices; and
obtain the transmission path responsive to determining the time sequence at which the target packet arrives at the N network devices.

12. The management device of claim 10, wherein when executed by the processor, the instructions further cause the management device to:
determine, based on a time sequence of receiving the N mirrored packets and the identifier, a time sequence at which the target packet arrives at the N network devices; and
obtain the transmission path responsive to determining the time sequence at which the target packet arrives at the N network devices.

13. The management device of claim 10, wherein when executed by the processor, the instructions further cause the management device to:
obtain first device data of the first to-be-determined faulty device and second device data of the second to-be-determined faulty device when the transmission path between the source end device and the destination end device is the normal flow path;
obtain third device data of the first to-be-determined faulty device and fourth device data of the second to-be-determined faulty device in a transmission process of the target packet;
determine device data change information of the first to-be-determined faulty device based on the first device data and the third device data, and device data change information of the second to-be-determined faulty device based on the second device data and the fourth device data; and
determine the faulty device based on the device data change information of the first to-be-determined faulty device and the device data change information of the second to-be-determined faulty device, wherein
the first device data, the second device data, the third device data, and the fourth device data all comprise at least one of management plane data, data plane data, or control plane data.

14. A packet transmission path determining system, comprising:
a management device configured to:
receive N mirrored packets of a target packet, wherein each of the N mirrored packets is from one of N network devices that transmits the target packet and is based on a transmission control protocol (TCP) flag in the target packet, wherein the target packet is a TCP synchronize (SYN) packet comprising the TCP flag, wherein each of the N mirrored packets comprises an identifier of a respective network device of the N network devices, wherein a source end device of the target packet and a destination end device of the target packet are separately connected to a communication network to which the N network devices belong, wherein the target packet originates from the source end device and that is sent to the destination end device, and wherein N is an integer greater than 1;
determine a transmission path of the target packet based on the N mirrored packets;
determine, using the N mirrored packets and based on the target packet, whether a communication process between the source end device of the target packet and the destination end device of the target packet has succeeded;
determine the transmission path as an abnormal flow path when the communication process has failed based on the target packet;
determine, based on the abnormal flow path and a normal flow path, a faulty device that causes the communication process to fail based on the target packet, wherein the normal flow path is a historical path in which the communication process has succeeded; and
when the abnormal flow path is different from the normal flow path, determine, based on the abnormal flow path and the normal flow path, the faulty device that causes the communication process, based on the target packet, between the source end device and the destination end device to fail comprises:
determine a first network device in the normal flow path as the faulty device when the first network device in the normal flow path is different from a first network device in the abnormal flow path; and determine an $(i-1)^{th}$ network device in the normal flow path as a first to-be-determined faulty device, an $i^{th}$ network device in the normal flow path as a second to-be-determined faulty device, and the faulty device in the first to-be-determined faulty device and the second to-be-determined faulty device when a first i−1 network devices in the normal flow path are same as a second i−1 network devices in the abnormal flow path and a target condition is met, wherein $1<i\leq M$, $i-1\leq N$, and M is a quantity of network devices in the normal flow path, and wherein the target condition includes N=i−1, or N>i−1 and the ith network device in the normal flow path is different from an ith network device in the abnormal flow path; and a network device coupled to the management device and configured to:
   generate, after receiving the target packet, a mirrored packet of the target packet, wherein the mirrored packet comprises an identifier of the network device; and
   send the mirrored packet to a management device to enable the management device to determine a transmission path of the target packet.

15. The packet transmission path determining system of claim 14, wherein the management device is configured to determine the transmission path based on the N mirrored packets by:
   determining, based on a time to live in the N mirrored packets and the identifier, a time sequence at which the target packet arrives at the N network devices; and
   obtaining the transmission path responsive to determining the time sequence.

16. The packet transmission path determining system of claim 14, wherein the management device is configured to determine the transmission path based on the N mirrored packets by:
   determining, based on a time sequence of receiving the N mirrored packets and the identifier, a time sequence at which the target packet arrives at the N network devices; and
   obtaining the transmission path responsive to determining the time sequence at which the target packet arrives at the N network devices.

17. The packet transmission path determining system of claim 14, wherein after determining the transmission path, the management device is further configured to:
   determine, using the N mirrored packets, whether a communication process between the source end device of the target packet and the destination end device of the target packet has succeeded based on the target packet; and
   determine the transmission path as an abnormal flow path when the communication process between the source end device and the destination end device has failed based on the target packet.

18. The packet transmission path determining system of claim 14, wherein the target packet is a TCP control packet, and wherein the management device is further configured to determine whether the communication process has succeeded based on the target packet by establishing a TCP connection based on the target packet or disconnecting a TCP connection based on the target packet.

19. The packet transmission path determining system of claim 14, wherein when the abnormal flow path is same as the normal flow path, the management device is further configured to determine, based on the abnormal flow path and the normal flow path, the faulty device that causes the communication process, based on the target packet, between the source end device and the destination end device to fail by:
   determining a last network device in the normal flow path and the destination end device as to-be-determined faulty devices; and
   when determining that the last network device is not faulty, determining the destination end device as the faulty device.

20. The packet transmission path determining system of claim 14, wherein the management device is further configured to output an identifier of the faulty device and a fault root cause of the faulty device, wherein the fault root cause of the faulty device is based on device data change information of the faulty device.

* * * * *